(No Model.)
W. RICHARDSON.
ATTACHMENT FOR DUST COLLECTORS.
No. 343,548. Patented June 8, 1886.
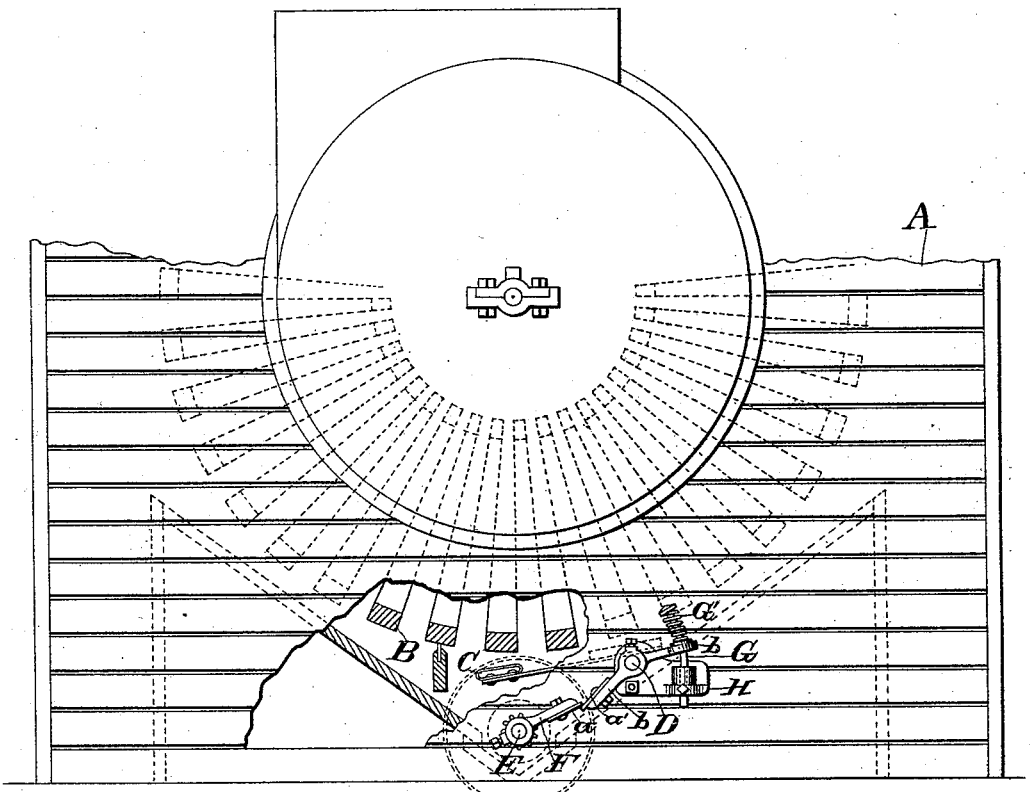
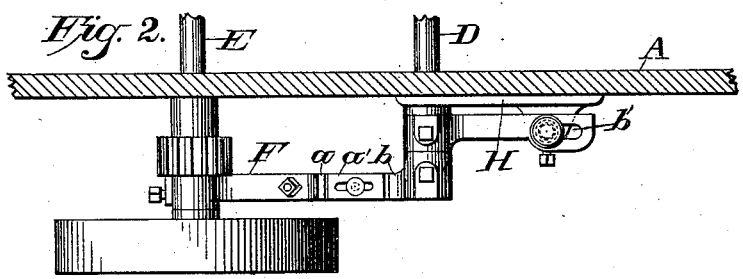
Witnesses:
E. G. Somers
R. Platz
Inventor:
William Richardson
By Stout & Underwood
Attorneys.

UNITED STATES PATENT OFFICE.

WILLIAM RICHARDSON, OF MILWAUKEE, WISCONSIN, ASSIGNOR TO THE MILWAUKEE DUST COLLECTOR MANUFACTURING COMPANY, OF SAME PLACE.

ATTACHMENT FOR DUST-COLLECTORS.

SPECIFICATION forming part of Letters Patent No. 343,548, dated June 8, 1886.

Application filed November 17, 1885. Serial No. 183,079. (No model.)

*To all whom it may concern:*

Be it known that I, WILLIAM RICHARDSON, of Milwaukee, in the county of Milwaukee, and in the State of Wisconsin, have invented certain new and useful Improvements in Attachments for Dust-Collectors; and I do hereby declare that the following is a full, clear, and exact description thereof.

My invention relates to dust-collectors for mills, and will be fully described hereinafter.

In the drawings, Figure 1 is an elevation of a portion of a dust-collector with parts of its frame broken away. Fig. 2 is a detail.

A is the frame, partly broken away, and B is the balloon, partly broken away and in section. This balloon is revolved in any suitable manner, and as it revolves is to be shaken at intervals by means of a knocker, C, which is secured to a shaft, D, as shown and described in my application for patent numbered 157,175 and filed February 27, 1885.

The object of my present invention is to produce a convenient device for imparting a motion to the knocker from the conveyer-shaft E, and this is done by means of a dog, F, one end of which is secured to the conveyer-shaft outside of the frame of the machine, while its other end projects out at right angles to the conveyer-shaft, and is preferably armed with a contact-plate, $a$.

$b$ is another dog, that is secured near its center to the knocker-shaft D, one of its ends being also preferably armed with a striking-plate, $a'$, while its other end is slotted, as at $b'$, to receive a curved rod, G, which is headed at its upper end and carries a spring, G', which is interposed between its head and the adjacent end of the dog $b$. The lower end of rod G is adjustably secured by a set-nut or other suitable means in a sleeve on a plate, H, which plate also forms a bearing for the knocker-shaft.

I preferably make the dog $b$ in two parts, which are adjustable with relation to each other, as shown in Fig. 2, so that the parts or sections may be set so as to form an angle, as shown in Fig. 1, which may be more or less acute, as it is desired to give the knocker greater or less throw.

The operation of my device is as follows: The balloon has an intermittent motion about its axis, while the conveyer-shaft E has a steady and continuous revolution, and as it revolves carries the dog F around with it. The latter will strike the plate $a'$ on the dog $b$, depressing it until it has wedged past it, when the dog $b$ being released will be returned by the spring G' on the opposite end, and then will cause the knocker to strike the balloon, to be again depressed and released at each revolution of the conveyer-shaft and the dog F, the force of the blow being regulated by the tension of the spring and by the position of the sections of dog $b$ with relation to each other.

Having thus fully described my invention, what I claim as new, and desire to secure by Letters Patent, is—

1. The combination, with the conveyer-shaft, of dogs F and $b$, the curved rod, its spring, and the knocker.

2. The combination, with the dog F and conveyer-shaft, of the two-part dog $b$, spring, adjustable curved rod, and the knocker, as set forth.

In testimony that I claim the foregoing I have hereunto set my hand, at Milwaukee, in the county of Milwaukee and State of Wisconsin, in the presence of two witnesses.

WILLIAM RICHARDSON.

Witnesses:
S. S. STOUT,
H. G. UNDERWOOD.